United States Patent [19]
Fish

[11] 3,847,574
[45] Nov. 12, 1974

[54] CHARCOAL FILTER ARRANGEMENT

[75] Inventor: James F. Fish, Louisville, Ky.

[73] Assignee: American Air Filter Company, Inc., Louisville, Ky.

[22] Filed: Mar. 14, 1973

[21] Appl. No.: 341,126

[52] U.S. Cl.................. 55/387, 55/475, 55/476, 55/479, 55/516, 55/519
[51] Int. Cl............................................. B01d 53/14
[58] Field of Search............. 55/278, 316, 387, 390, 55/475, 476, 478–479, 484–485, 512, 515, 55/516, 519

[56] References Cited
UNITED STATES PATENTS

| | | | |
|---|---|---|---|
| 2,108,087 | 2/1938 | Thayer............................ | 55/476 X |
| 2,150,930 | 3/1939 | Lassiat........................... | 55/476 UX |
| 2,521,060 | 9/1950 | Hallinan.......................... | 55/484 X |
| 2,526,782 | 10/1950 | Thorpe............................ | 55/387 X |
| 2,686,572 | 8/1954 | Cameron et al................. | 55/476 X |
| 3,246,455 | 4/1966 | Boddy............................. | 55/319 |
| 3,330,101 | 7/1967 | Murphy........................... | 55/484 |
| 3,353,339 | 11/1967 | Walter............................ | 55/387 X |

FOREIGN PATENTS OR APPLICATIONS

| | | | |
|---|---|---|---|
| 781,602 | 5/1935 | France............................ | 55/479 |
| 812,635 | 5/1937 | France............................ | 55/484 |

*Primary Examiner*—Frank W. Lutter
*Assistant Examiner*—Kathleen J. Prunner

[57] ABSTRACT

A carbon filter having an elongated cylindrical housing with a cylindrical filter assembly located axially therein, the cylindrical filter assembly having a plurality of flow-through geometrically shaped axially extending exit and entrance chambers with a loosely packed carbon filter bed therebetween. The entrance and exit chambers are positioned equidistant from each other in alternating fashion, with each flow-through entrance chamber advantageously adjacent at least two flow-through exit chambers and each flow-through exit chamber advantageously adjacent at least two flow-through entrance chambers. The filter assembly additionally comprises a forced-feed charcoal reservoir means maintaining a constant pressure on the loosely packed bed to keep it filled.

3 Claims, 3 Drawing Figures

CHARCOAL FILTER ARRANGEMENT

BACKGROUND OF THE INVENTION

The invention relates to improvements in carbon filter bed arrangements. It more particularly relates to a cylindrical carbon filter containing activated granular charcoal loosely compacted in the form of a bed for treating gases. Typically, gas purification methods of commercial value must be capable of treating gases moving at relatively high gas velocities. Due to the high velocities encountered it may be necessary to connect a plurality of purifying apparatuses in series, one after the other in order to obtain a sufficiently long time of treatment to effect the purification. The high velocities used in such gas purification have the advantage of a considerably better exchange of material so that in principal the required time of treatment decreases. The gas velocity which is encountered in each case influences the grain size of the purifying material, with this grain size determining ultimately the number of apparatuses to be connected in series. However, the prior art systems do not provide a filter assembly having a large surface area filter bed being of the size needed to accommodate high velocity gas flow rates and yet free from concomitant problems of settling and particle attrition. Also the prior art systems are typically so cumbersome that they cannot be used in location where space is limited. The present invention is a straightforward, inexpensive, readily constructed and easily maintained apparatus which solves the above prior art problems.

SUMMARY OF THE INVENTION

The present invention provides a filter arrangement including a cylindrical housing and a cylindrical filter arrangement axially located therein, which contains a particulate carbon filter bed of uniform thickness and means to maintain said bed in a condition free from adverse effects of settling or particle attrition. More specifically, the present invention provides a filter arrangement wherein a large surface area carbon filter bed is maintained in filled condition by a forced-feed carbon particle reservoir in flow communication with the bed. The present invention provides a carbon filter for removing gaseous contaminants comprising: a flow-through housing having inlet and outlet connections in flow communication with the interior thereof; a filter assembly, located within said flow-through housing having at least one geometrically shaped flow-through axially extending exit chamber and at least one geometrically shaped flow-through axially extending entrance chamber, said entrance chamber being in flow communication with said inlet connection and said exit chamber being in flow communication with said outlet connection; granulated activated charcoal disposed within the space between said entrance chamber and said exit chamber to form a loosely packed granular charcoal filter bed of uniform flow-through thickness; and, forced-feed charcoal reservoir means containing flowable particulate activated charcoal in flow communication with said charcoal filter bed to keep said bed continuously filled.

The apparatus of this invention is found to be particularly useful in the field of nuclear containment where carbon filters are typically used to remove nuclear contaminants from gas streams.

DESCRIPTION OF THE PREFERRED EMBODIMENT

Figure 1:
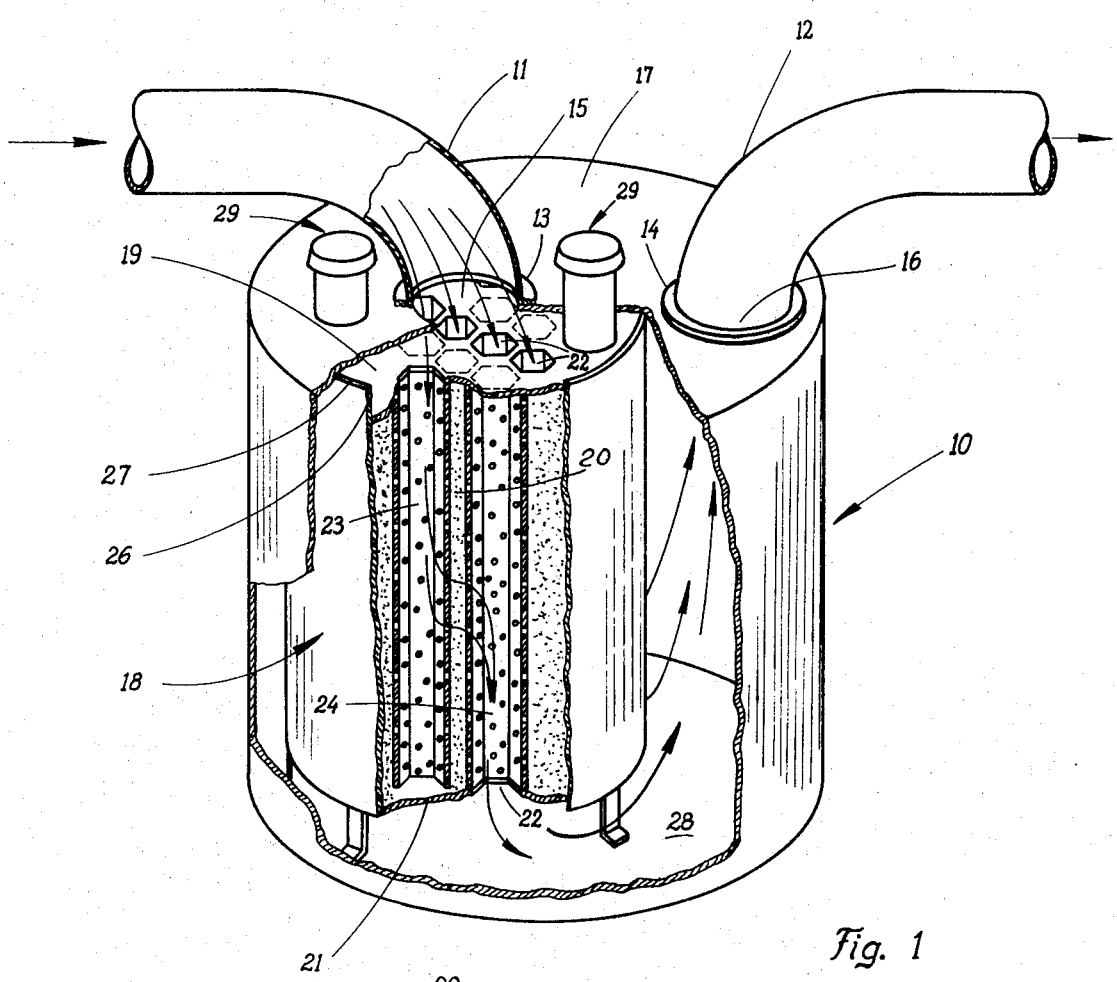
FIG. 1 is an isometric view of the carbon filter having cutaway sections showing specific details of its construction.

FIG. 1 shows a housing 10 having top 17, bottom 28 and an inlet 11 and an outlet 12 in flow communication with the interior of the housing. Inlet 11 and outlet 12 have flange members 13 and 14, respectively, which are attached to top 17 of housing 10. These flange members are adapted to be easily affixed to the peripheral edges of openings 15 and 16 of top 17 in such a manner that they are readily disconnected for removal to facilitate either removal of top 17 and replacement of cylindrical filter assembly 18 or replacement of the entire housing 10 with a housing having a new or regenerated cylindrical filter assembly therein.

Cylindrical filter assembly 18 has upper and lower ends 19 and 21, respectively. Upper and lower ends 19 and 21 include openings 22 of hexagonal cross section arranged in spaced rows extending across the breadth of the ends. These openings 22 form the mouth portions of a plurality of flow-through axially extending entrance and exit chambers 23 and 24, respectively, of hexagonal cross section. Each of openings 22 in upper end 19 is connected in flow communication with a flow-through axially extending entrance chamber 23 having a hexagon shaped cross section. Each of openings 22 in lower end 21 is connected in flow communications with a flow-through axially extending exit chamber 24 having a hexagon shaped cross section. The entrance and exit chambers are positioned equidistant from each other in alternating fashion and secured to ends 19 and 21 by welding, gluing or the like, such that each flow through entrance chamber 23 circumscribes an aperture 22 in ends 19 and terminates at a solid portion of end 21 and each exit chamber circumscribes an aperture 22 in end 21 and terminates at a solid portion of end 19. Advantageously, each flow-through entrance chamber is adjacent at least two flow through exit chambers and each flow through exit chamber is adjacent at least two flow through entrance chambers. Granular activated charcoal occupies the space between the entrance and exit chambers to form a loosely packed filter bed as will be disclosed hereinafter.

Cylindrical filter assembly 18 further comprises peripheral skirt 26, which can be merely an extension of filter assembly 18 which projects beyond upper end 19. The uppermost peripheral edge 27 of peripheral skirt 26 is sealingly attached to the underside of top 17 in such a manner that it circumscribes opening 15, thereby forming an inlet plenum above upper end 19. Assembly 18 including entrance and exit chambers 23 and 24, respectively, may be fabricated from any one of a number of suitable materials known in the art, and advantageously, a lightweight thin gauge aluminum, steel or even wood, polymeric resinous materials, or paperboard, or other suitable materials can be utilized.

It should be noted from FIG. 1 that cylindrical filter assembly 18 does not extend axially all the way to bottom 28 of cylindrical housing 10. This is of course necessarily the case so that treated gas may be withdrawn through exit chambers 24 and out through outlet 12. Such an arrangement whereby peripheral skirt 26 is sealed to the underside of top 17 to form an inlet plenum chamber provides for the remainder of the space inside housing 10 to serve as an outlet plenum chamber, it being in flow communication with outlet 12.

Alternative to the arrangement of entrance and exit chambers shown in the drawing a filter arrangement constructed in accordance with U.S. Pat. No. 3,330,101 (incorporated herein by reference) would be used within assembly 18 without destroying the concept of a filter assembly including a housing within a housing and a positive feed bed filter arrangement.

Figure 2:
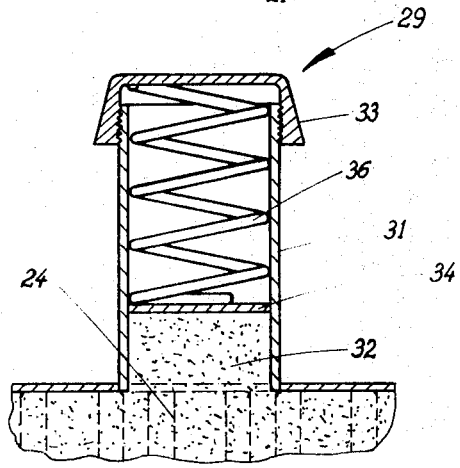
FIG. 2 is a cross-sectional view of the forced-feed charcoal reservoir means of FIG. 1.

One advantageous feature of the filter assembly shown in FIG. 1 is the forced-feed charcoal reservoir means 29 shown in FIG. 2. Forced-feed charcoal rservoir means 29 comprises cylindrical container 31, filled with flowable particulate activated charcoal 32, and a removable screw cap 33. Inside cylindrical container 31 is flat solid plate means 34 concentrically positioned contacting activated charcoal 32. Also, positioned concentrically within cylindrical container 31 is spring means 36 which abuts screw cap 33 and biases plate means 34 against activated charcoal 32, thereby creating a constant pressure on the activated charcoal which comprises carbon filter bed 20 between entrance chambers 23 and exit chambers 24. It should be noted that forced-feed charcoal reservoir means 29 extend through cylindrical housing 10 so that access may be had to screw cap 33 from the exterior of housing 10. Such an arrangement allows screw cap 33, spring means 36 and plate means 34 to be removed and more flowable particulate activated charcoal to be added at periodic intervals. Such an arrangement thereby insures that the carbon filter apparatus will always have an ample supply of carbon filtering material. This feature becomes more significant when it is recognized that operational vibrations cause the carbon material to settle as well as abraid to form smaller particles, which in each instance opens voids in the filter bed. Forced-feed charcoal reservoir means 29 are shown only at one end of cylindrical filter assembly 18, however it is understood that under certain circumstances it may be desirable, if not necessary, to provide such reservoir means at both ends of the filter assembly. Provision of course would be made for access to all of the screw caps 33. Another advantageous feature of the forced-feed charcoal reservoir means 29 is that they exert pressure upon the carbon filter bed irrespective of the bed's orientation. Thus, should the carbon filter assembly of this invention be used in aircraft or other like applications forced-feed charcoal reservoir means 29 would insure a closely packed charcoal filter bed. It should further be noted that a cylindrical filter assembly could be manufactured in sections with each section being provided with a forced-feed charcoal reservoir means to insure a homogenously packed bed throughout its entire length.

It should be noted that if circumstances so warrant, a much smaller filter could be fabricated wherein top 17 would have a diameter equal to the diameter of peripheral skirt 26 and then a second peripheral skirt could be attached to cylindrical filter assembly 18 at its lower end, such peripheral skirt being identical to the peripheral skirt 26. This second peripheral skirt would then be sealingly attached to bottom 28, which would be of a diameter equal to the diameter of the second peripheral skirt. Outlet 12 would then be attached in flow communication with bottom 28 in a manner such as to provide a straight through filter assembly of much smaller diameter than the filter assembly shown in FIG. 1.

Figure 3:
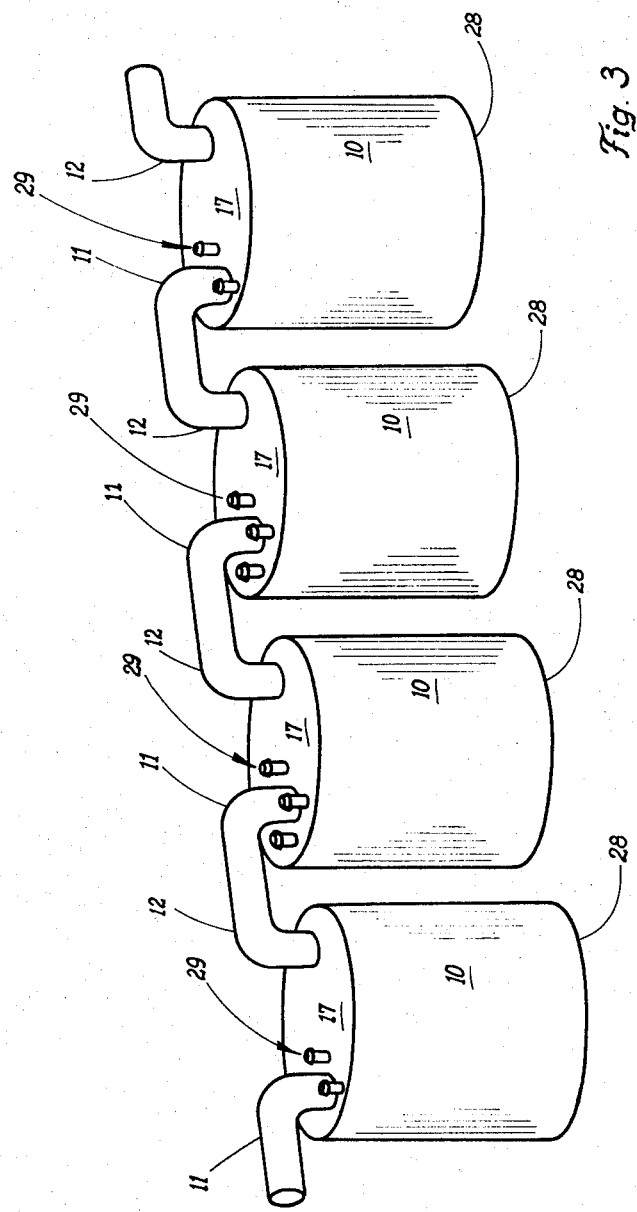
FIG. 3 is a schematic view showing a plurality of carbon filters of FIG. 1 connected in series.

FIG. 3 shows a plurality of housings 10 containing cylindrical filter assemblies connected in flow communication in series. It should be noted that in such an arrangement it is possible to utilize various forms of carbon filters each having a specific function. For example, it is possible in the first of the filter arrangements to have a filter wherein large granular particles are employed while in the second smaller particles are employed and in the third the carbon particles are treated with, for example, an iodine solution followed perhaps by a fourth wherein the carbon particles are treated with still another solution.

Having thus described the invention, what is claimed is:

1. A carbon filter for removing gaseous contaminants comprising: a flow-through housing having inlet and outlet connections in flow communication with the interior thereof;
   a filter assembly, located within said flow-through housing having a plurality of geometrically shaped flow-through axially extending exit chambers and a plurality of geometrically shaped flow-through axially extending entrance chambers, said entrance chambers being in flow communication with said inlet connection and said exit chambers being in flow communication with said outlet connection, said filter assembly being cylindrical and comprises said plurality of flow-through axially extending exit and entrance chambers positioned equidistant from each other in alternating fashion such that each flow-through entrance chamber is adjacent at least two flow-through exit chambers and each flow exit chamber is adjacent at least two flow-through entrance chambers, said cylindrical filter assembly located within said cylindrical housing additionally comprises a peripheral skirt extending from one end thereof which is sealingly attached to one end of said housing, circumscribing said inlet connection of said housing, to form an inlet plenum in flow communication with said connection and the entrance chamber of said filter assembly;
   granulated activated charcoal disposed within the space between said entrance chambers and said exit chambers to form a loosely packed granular charcoal filter bed of uniform flow-through thickness; and
   forced-feed charcoal reservoir means extending through the walls of said housing to allow access to said reservoir from outside said housing, said reservoir means containing flowable particulate activated charcoal in flow communication with said charcoal filter bed to keep said bed continuously filled, said forced feed charcoal reservoir means comprises an elongated cylindrical container filled with flowable particulate activated charcoal in flow communication with the filter bed of said filter assembly, said cylindrical container having a removable screw cap, flat solid plate means concentrically positioned therein contactijng said flowable particulate activated charcoal, and spring means abutting said screw cap and biasing said solid plate means against said charcoal in said reservoir to keep constant pressure on said charcoal filter bed of the filter assembly.

2. The apparatus of claim 1 where said inlet and outlet connections are positioned on the same end of said housing to allow two or more housings to be connected in series.

3. The apparatus of claim 1 wherein said axially extending exit and entrance chambers are of hexagonal cross section.

* * * * *